United States Patent [19]

Lerner

[11] 4,045,117

[45] Aug. 30, 1977

[54] COMBINED CAMERA LENS CAP AND LENS SHADE

[76] Inventor: Jack Lerner, 337 W. 71st St., New York, N.Y. 10023

[21] Appl. No.: 679,561

[22] Filed: Apr. 23, 1976

[51] Int. Cl.² ............................................. G03B 11/04
[52] U.S. Cl. ...................................... 350/60; 350/65; 354/287; 150/52 J; 229/41 C
[58] Field of Search ..................... 350/60, 58, 65, 319; 354/287; 229/41 C, 39; 150/52 J; 222/528, 503

[56] References Cited

U.S. PATENT DOCUMENTS

| 720,900 | 2/1903 | Dorr | 354/287 |
|---|---|---|---|
| 2,093,237 | 9/1937 | Dolecki | 350/60 |
| 2,266,914 | 12/1941 | Skinner | 350/60 |
| 3,526,352 | 9/1970 | Swett | 229/39 R |
| 3,715,149 | 2/1973 | Freeland | 350/65 |

FOREIGN PATENT DOCUMENTS

| 379,669 | 8/1923 | Germany | 350/60 |

*Primary Examiner*—Jon W. Henry
*Attorney, Agent, or Firm*—Albert F. Kronman

[57] ABSTRACT

A combined camera lens cap and lens shade in which a housing having a plurality of swingable flaps thereon is secured to a camera lens. Actuating means is provided to swing the flaps from a closed position where they overlie the front of the lens to form a lens cap to an open position where they extend outwardly from the periphery of the lens to form a lens shade.

4 Claims, 8 Drawing Figures

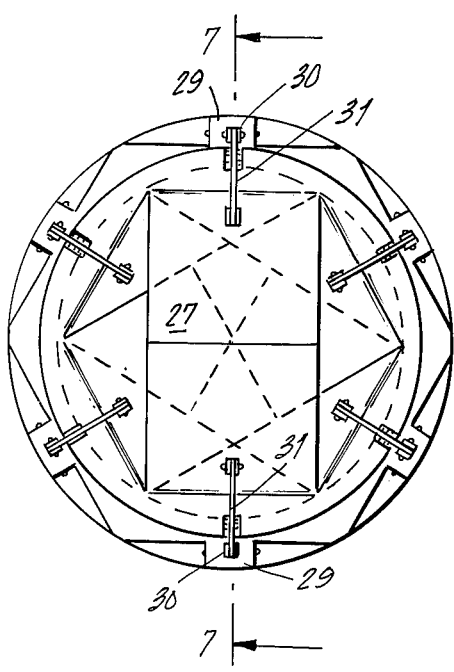
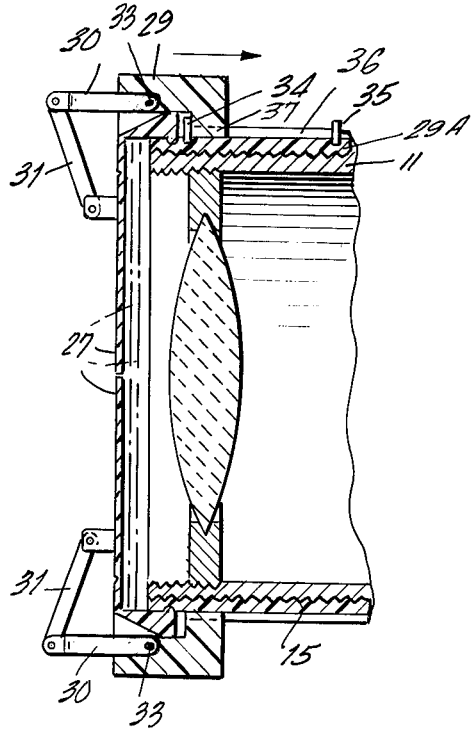
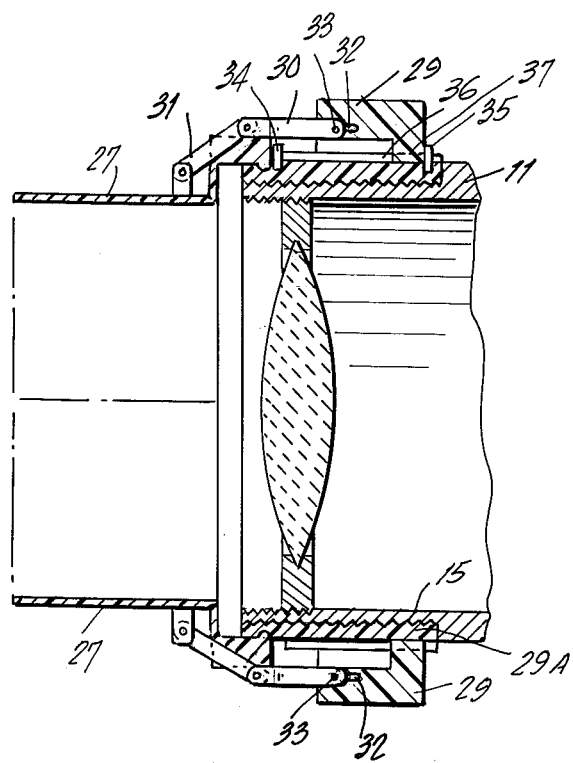

COMBINED CAMERA LENS CAP AND LENS SHADE

BACKGROUND OF THE INVENTION

It is well known in the photographic art to provide lens caps to protect camera lenses when not in use. In addition, sun shades have been used to protect the camera lens from ambient glare while pictures are being taken. Generally the sunshades are in the nature of a structure which extends from the lens of the camera and must be removed when the camera is stored away as in a camera carrying case. Lens caps are normally of a flat configuration but must be removed when a picture is taken. Prior art patents such as U.S. Pat. Nos. 3,909,107, and 3,715,149, have attempted to combine the sun shade and lens cap without substantially reducing the overall length of the sun shade. The device, therefore, has to be removed from the camera in order to place it in a carrying case.

Other prior art patents such as U.S. Pat. Nos. 1,525,768 and 2,093,237 have provided lens shades which are not satisfactory as lens caps. Moreover, such prior art devices are difficult to open and close so that they are inconvenient for rapid photographic use.

Accordingly, it is an object of the present invention to provide a combined camera lens cap and lens shade of simplified construction which may be left upon the lens of the camera when it is stored away and which nevertheless is capable of rapid adjustment from the lens cap position to the lens shade mode and back again.

SUMMARY

The present invention relates to a housing made of somewhat rigid material and capable of being secured to the periphery of a camera lens. The housing is fitted with a series of flaps which are articulated so that they can be shifted from a position overlying the lens to form a lens cap and thereafter opened into a lens shading configuration for picture taking. Means such as links, flap springs, or tabs are used to operate the combined camera lens cap and lens shade and permit one-hand rapid adjustment.

DESCRIPTION OF THE DRAWINGS

In the accompanying drawings forming part hereof, corresponding elements have been given identical reference numerals in which drawings;

FIG. 6 is a view in front elevation of a second embodiment of the present invention.

FIG. 7 is a longitudinal sectional view taken on line 7—7 in FIG. 6.

FIG. 8 is a view similar to FIG. 7 in the open position.

DESCRIPTION OF THE PREFERRED EMBODIMENTS

Figure 1:
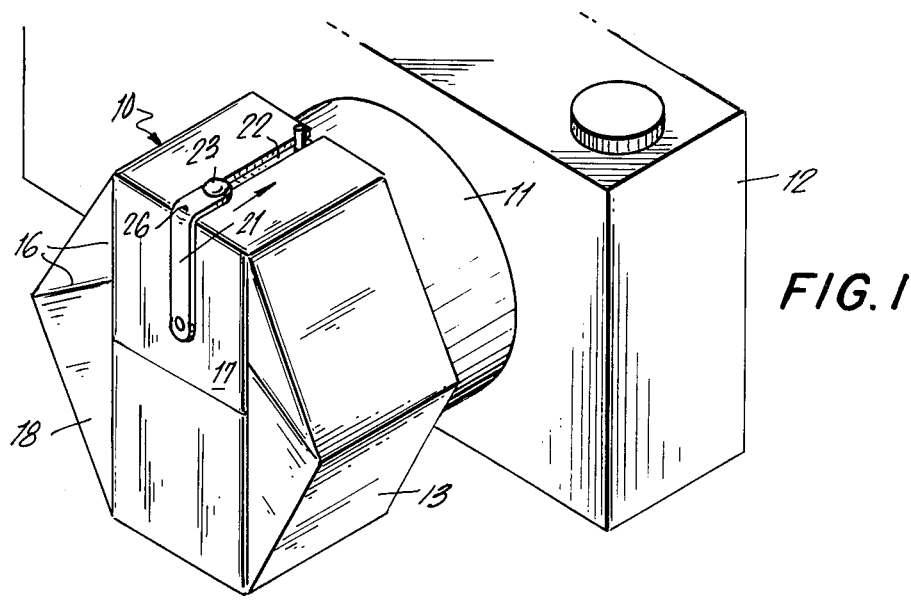
FIG. 1 is a somewhat isometric view of one complete embodiment of the present invention.

Referring to FIGS. 1 - 4, 10 indicates a combined camera lens cap and lens shade comprising one embodiment of the present invention. The said camera lens cap and lens shade is secured to the lens 11 of a camera 12 in the manner shown in FIG. 1. The body of the combined camera lens cap and lens shade consists of a light tight hollow housing 13 having a ring 14 (best shown in FIG. 4) by means of which the housing may be secured to the camera lens 11. The ring 14 may be secured by means of threads 15 tabs (not shown) or any other suitable means well known in the art.

The housing 13 is preferably made of a rigid plastic such as vinyl, acetate, styrene or any other well-known material capable of excluding light.

Figure 2:
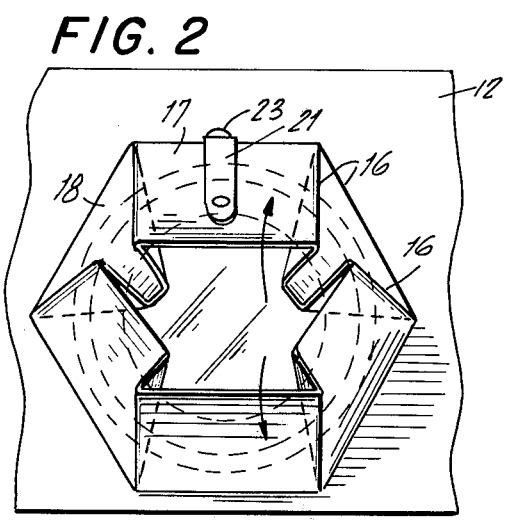
FIG. 2 is a view in front elevation showing the combined camera lens cap and lens shade of FIG. 1 in a partially open position.
Figure 3:
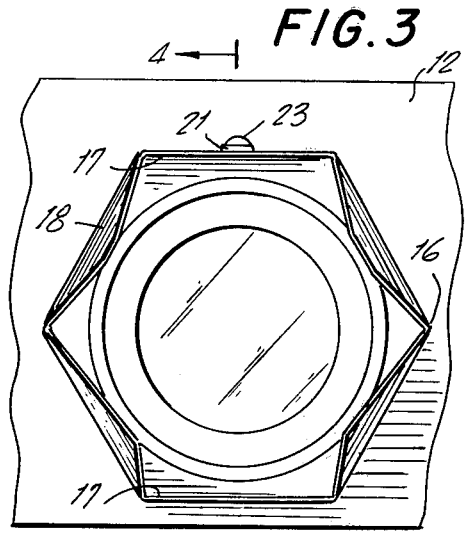
FIG. 3 is a view similar to FIG. 2 in the open position.
Figure 5:
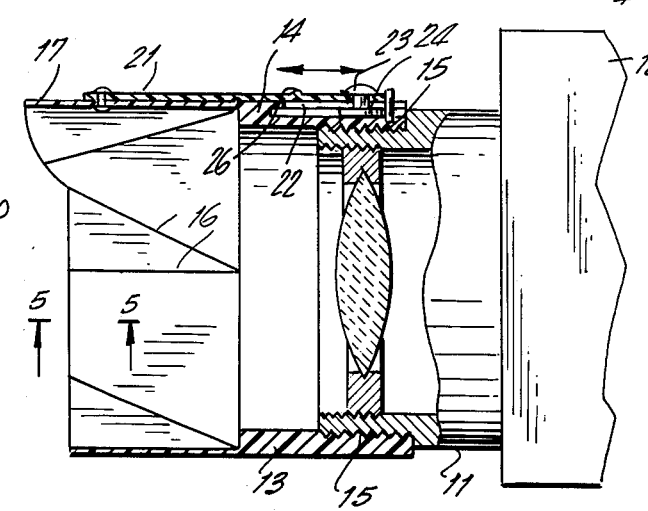
FIG. 5 is a fragmentary view taken on line 5—5 in FIG. 4.
Figure 4:
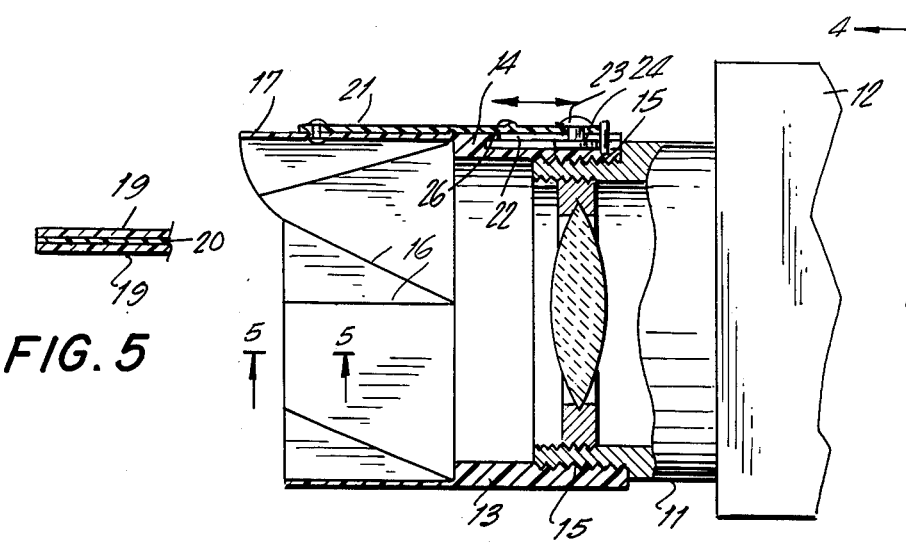
FIG. 4 is a sectional view taken on line 4—4 in FIG. 3 looking in the direction of the arrows.

The portion of the housing 13 opposite the camera 12 is formed into a series of connected flaps 17, 18 which may be made of the same material as a housing 13 but which nevertheless are capable of being interfolded in the manner shown in FIGS. 2 and 3. The flaps 17, 18 may be caused to fold by means of fold lines 16 or alternately, the flaps may be made in a laminated structure best shown in FIG. 5. The laminated structure consists of an outer layer and an inner layer of rigid plastic 19 having therebetween a flexible sheet such as vinyl or some other suitable plastic 20. By scoring the rigid plastic 19, the flexible sheet 20 becomes a hinge for the flaps 17, 18. It is to be understood, that the scoring will be located along the fold lines 16 indicated in FIGS. 1 and 3.

In order to move the flaps 17, 18 from the lens cap position shown in FIG. 1 to the lens shade position shown in FIG. 3, there is provided a small articulating strip 21 secured at one end to one of the flaps 17 and slideably received at its other end within a groove 22 in the top of the housing 13. A small button 23 having a flange 24 on the bottom thereof is located at the inner end of the strip 21 for operating the device. Thebutton 23 is accessible to the camera user's thumb and the flange portion 24 slides within the groove 22. The strip 21 is preferably made of flexible material such as steel spring or plastic having a set to it which normally causes it to assume the angular position shown in FIG. 1. It will be apparent that as the button 23 is pulled back from the position of FIG. 1 to that of FIG. 4, the strip 21 will, having passed the point of permanent set 26, straighten out in the manner shown in FIG. 4 and thereby lift all of the flaps into the horizontal or lens shade position.

When the strip 21 is pushed forward it will slide forward until it again assumes its right angle configuration due to the prestressing of the material of the said strip. As the strip assumes this right angle position it will fold the flaps 17, 18 into the lens cover configuration shown in FIG. 1.

Referring to FIGS. 6 through 8, there is shown a second embodiment of the present invention in which a plurality of individual flaps 27 are hinged to a housing 29A secured to a camera lens 11 by means of threads 15. A ring 29 is longitudinally slidable upon the housing 29A as shown in FIGS. 7 and 8. Links 30,31 couple the ring 29 to the flaps 27 in such manner that longitudinal movement of the ring 29 will result in the actuation of the flaps 27. The ring 29 is limited to its travel by stops 34, 35. The stops 34, 35 are disposed within recesses 36 within the housing 29A upon which the ring 29 slides. It will be apparent from FIGS. 7 and 8 that the ring 29 is formed with depending portions 37 which ride within the slots 36.

Lost motion slots 32 best shown in FIG. 8 are provided in the ring 29 and receive therein plus 33 carried in the ends of links 30. As a result of the lost motion slots (which are of different lengths) the opening and closing of flaps 27 is sequentially controlled.

It will be seen that when the embodiment of FIGS. 6 through 8 is in the closed position as shown in FIGS. 6 and 7, a compact lens cap is provided. When the device is in the open position shown in FIG. 8, the flaps 27 provide a light excluding lens shade for the camera. Moreover, the device may be shifted from one use to another by a short traverse of the ring 29 which traverse may be effected by one-hand operation.

Having thus fully described the invention what is desired to be protected by Letters Patent and claimed is:

1. A combined camera lens cap and lens shade comprising a hollow housing open at each end for attachment to a camera lens, a plurality of flaps hingedly secured to the periphery of the housing opposite the camera lens receiving end thereof, said flaps being interconnected along their adjacent margins by fold lines and swingable from a closed position overlying the end of the housing to which they are secured to an open position substantially coaxial with the said housing end, said flaps being of a size which will cover the housing end to which they are attached when in the closed position and means operatively coupled to at least one of the flaps comprising an elongated groove in the housing, a strip of flexible material secured at one end to said flap and slidably received at its other end within the groove to actuate the said flaps.

2. A device according to claim 1 in which the strip is pre-set into an angular configuration so as to conform to the housing and flap when said strip is in the closed position, and an actuating button on the other end of the said strip and means on said button to freely slide within the groove.

3. A device according to claim 2 in which the strip is of flap spring material.

4. A combined camera lens cap and lens shade comprising a hollow housing open at each end for attachment to a camera lens, a plurality of flaps hingedly secured to the periphery of the housing opposite the camera lens receiving end thereof, said flaps being individual members swingable from a closed position overlying the end of the housing to which they are secured to an open position substantially coaxial with the said housing end, said flaps being of a size which will cover the housing end to which they are attached when in the closed position and means to actuate said flaps comprising links operatively coupled at one end to the flaps and at their other ends to a ring longitudinally slidable upon the housing, pins at the ring ends of said links, said ring being formed with lost motion slots to receive the said pins.

* * * * *